(12) United States Patent
Lee (10) Patent No.: US 9,215,555 B2
(45) Date of Patent: Dec. 15, 2015

(54) APPARATUS AND METHOD FOR GUIDING SHADOW AREA

(71) Applicant: Hyundai Motor Company, Seoul (KR)

(72) Inventor: Jeong Tae Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/134,220

(22) Filed: Dec. 19, 2013

(65) Prior Publication Data

US 2015/0105108 A1    Apr. 16, 2015

(30) Foreign Application Priority Data

Oct. 10, 2013    (KR) .......................... 10-2013-0120532

(51) Int. Cl.
*H04W 4/02* (2009.01)
*H04W 64/00* (2009.01)

(52) U.S. Cl.
CPC ................ *H04W 4/02* (2013.01); *H04W 64/00* (2013.01)

(58) Field of Classification Search
CPC ......... G06Q 30/0261; H04M 3/42348; H04M 24/04; H04M 24/02; G01S 13/84; G01S 17/06; G01S 17/08; G01S 19/50; G01S 5/0009; G01S 5/06; H04W 24/04; H04W 24/02; H04W 36/32; H04W 64/006; H04W 48/04; H04W 4/027; H04W 64/00; H04W 4/02

See application file for complete search history.

(56) References Cited

U.S. PATENT DOCUMENTS

| | | | | |
|---|---|---|---|---|
| 5,757,289 | A * | 5/1998 | Nimura et al. | 340/995.21 |
| 7,298,323 | B2 * | 11/2007 | Park | 342/357.31 |
| 2002/0049534 | A1 * | 4/2002 | Yuda et al. | 701/209 |
| 2004/0073364 | A1 * | 4/2004 | Jung et al. | 701/213 |
| 2011/0231089 | A1 * | 9/2011 | Ikeuchi et al. | 701/201 |

FOREIGN PATENT DOCUMENTS

| | | |
|---|---|---|
| JP | 09-023476 | 1/1997 |
| JP | 2002116032 A | 4/2002 |
| KR | 10-2004-0033181 A | 4/2004 |
| KR | 10-2007-0066287 | 6/2007 |
| KR | 10-0865855 | 10/2008 |
| KR | 10-2009-0019142 A | 2/2009 |

* cited by examiner

*Primary Examiner* — Ajit Patel
(74) *Attorney, Agent, or Firm* — Mintz Levin Cohn Ferris Glovsky and Popeo, P.C.; Peter F. Corless (57) ABSTRACT

An apparatus and method for guiding a shadow area is provided. The method includes identifying a vehicle position on a driving path based on map information and global positioning system (GPS) information from a navigation system and analyzing road information in the shadow area by receiving position information for the shadow area on the driving path from a database in which information of the shadow area is stored. A remaining distance of the shadow area is calculated based on the vehicle position in the shadow area on the driving path and the remaining distance information of the shadow area is output.

18 Claims, 7 Drawing Sheets

APPARATUS AND METHOD FOR GUIDING SHADOW AREA

CROSS-REFERENCE TO RELATED APPLICATION

This application is based on and claims priority from Korean Patent Application No. 10-2013-0120532, filed on Oct. 10, 2013 in the Korean Intellectual Property Office, the disclosure of which is incorporated herein in its entirety by reference.

TECHNICAL FIELD

The present invention relates to an apparatus and a method for guiding a shadow area, and more particularly, to a technology that provides remaining distance information of a corresponding shadow area in a communications shadow area.

BACKGROUND

A vehicle system displays a communications state while a vehicle is driven, that is, a signal receiving state on a screen to enable a driver to recognize the signal receiving state in a corresponding area. When the vehicle enters a communications shadow area while being driven, a signal receiving disable state is displayed on the screen. In particular, the driver may recognize that the corresponding vehicle is positioned within the communications shadow area, but may not identify a range of the corresponding communications shadow area or that a signal receiving enable state is resumed when the corresponding vehicle passes through any point of the communications shadow area. When an emergency situation occurs in the vehicle while driving in the communications shadow area, the driver may not quickly response to the emergency situation since the corresponding vehicle system may be in a communications disable state.

SUMMARY

Accordingly, the present invention provides an apparatus and a method for guiding a shadow area to provide remaining distance information of the shadow area in a predetermined section unit when a vehicle enters a communications shadow area.

In one aspect of the present invention, an apparatus for guiding a shadow area may include: a position identifier configured to identify a position of a vehicle on a driving path based on map information and global positioning system (GPS) information from a navigation system; a shadow area information analyzer configured to analyze road information in the shadow area by receiving position information for the shadow area on the driving path from a database in which information of the shadow area is stored; a distance calculator configured to calculate a remaining distance of the shadow area based on a position of the vehicle in the shadow area on the driving path; and a display controller configured to output remaining distance information of the shadow area.

The shadow area information analyzer may be configured to detect a start position and a termination position of the shadow area on the driving path by receiving the map information for the driving path from the navigation system. In addition, the shadow area information analyzer may be configured to linearize a road for each road section in the shadow area on the driving path to extract an interpolation point in each linear section unit. The shadow area information analyzer may further be configured to identify position information of the interpolation points extracted for each road section in the shadow area on the driving path.

The distance calculator may be configured to compare positions of the interpolation points and the position of the vehicle in the shadow area on the driving path to calculate a distance to termination point of the shadow area based on a position of an interpolation point to which the vehicle approaches. The distance calculator may also be configured to calculate the distance to the termination point of the shadow area based on linear distances between the interpolation point to which the vehicle approaches and the respective interpolation points.

The display controller may be configured to output distance information to the termination point of the shadow area calculated based on the position of the interpolation point when the vehicle reaches the corresponding interpolation point in the shadow area on the driving path. The display controller may further be configured to output the distance information to the termination point of the shadow area in a form of indicator when the vehicle enters the shadow area. The display controller may be configured to update the indicator when the vehicle reaches each interpolation point in the shadow area. Further, the display controller may be configured to output the distance information to termination point of shadow area in a form of notification message when the vehicle reaches each interpolation area in the shadow area when the vehicle enters the corresponding shadow area. The position identifier may be configured to compare the driving path on the road provided from the navigation system and the position of the vehicle to correct a position coordinate of the vehicle with a position coordinate on the driving path.

In another aspect of the present invention, a method for guiding a shadow area may include: analyzing road information in the shadow area by receiving position information for the corresponding shadow area on a driving path from a database in which information of the shadow area is stored; identifying a position of a vehicle on the driving path based on GPS information to identify whether the vehicle enters the shadow area; when the vehicle enters the shadow area on the driving path, linearizing a corresponding road for each road section in the corresponding shadow area to identify positions of interpolation points extracted in each linear section unit; comparing positions of the interpolation points and the position of the vehicle to calculate a distance to a termination point of the shadow area based on a position of an interpolation point to which the vehicle approaches in the corresponding shadow area; and outputting distance information to the termination point of the shadow area calculated based on the position of the interpolation point to which the vehicle approaches.

The method may further include, after outputting the distance information, updating the distance information to the termination point of the shadow area based on a position of a next interpolation point when the vehicle reaches the next interpolation point in the shadow area on the driving path.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described with reference to the accompanying drawings.

Figure 1:
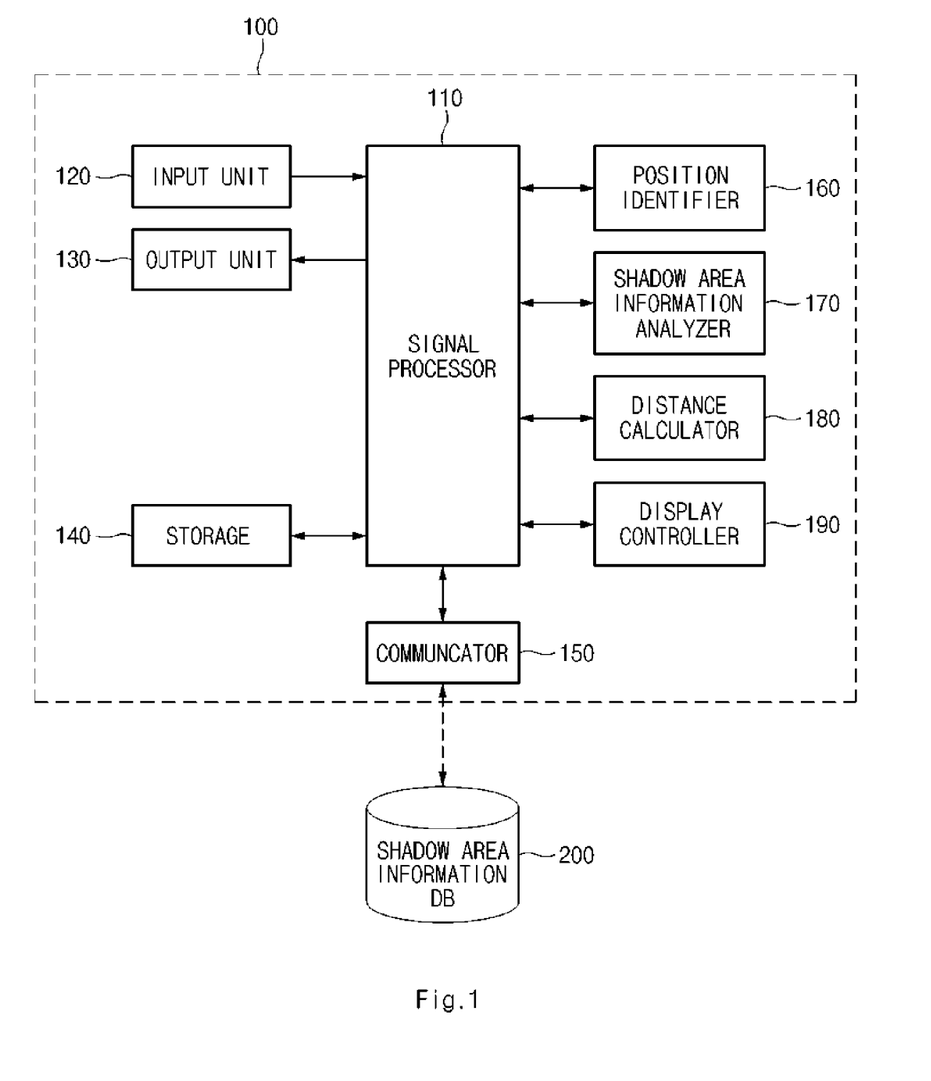
FIG. 1 is an exemplary block diagram showing a configuration of an apparatus for guiding a shadow area according to an exemplary embodiment of the present invention.

FIG. 1 is an exemplary block diagram showing a configuration of an apparatus for guiding a shadow area according to an exemplary embodiment of the present invention. Referring to FIG. 1, the apparatus 100 may include a signal processor 110, an input unit 120, an output unit 130, a storage 140, a communicator 150, a position identifier 160, a shadow area information analyzer 170, a distance calculator 180, and a display controller 190. In particular, the signal processor 110 may be configured to process a signal delivered between the respective units of the apparatus 100 for guiding the shadow area. In other words, the signal processor 110 may be configured to execute the units of the apparatus 100.

The input unit 120 may be configured to receive a predetermined control instruction from a user. Meanwhile, the input unit 120 may be an input terminal connected to a separate external device and may be configured to receive map information, driving path information, and the like from a navigation system connected thereto. The output unit 130 may be configured to output guide information for an operation state and a communications shadow area (hereinafter, referred to as 'shadow area') of the apparatus 100 for guiding the shadow area. The output unit 130 may be a display unit such as a monitor, a navigation screen, and the like disposed within a vehicle. In addition, the output unit 130 may further include a voice output unit such as a speaker, and may be configured to output guide information of the shadow area in a voice form by the voice output unit.

The storage 140 may be configured to store a setting value for an operation of the apparatus 100 for guiding the shadow area. In addition, the storage 140 may be configured to store the map information and the driving path information provided from the navigation system, position information of the vehicle, and information provided from a shadow area information database (DB) 200 having shadow area information stored therein, and may be configured to store a processing result by the apparatus 100 for guiding the shadow area. In particular, the shadow area information DB 200 may be configured to store position information for the shadow area, for example, latitude and longitude information for boundary points of the shadow area.

The communicator 150 may be configured to support a communications interface for communication with the shadow area information DB 200. Therefore, the communicator 150 may be configured to access the shadow area information DB 200 based on a request of the apparatus 100 for guiding the shadow area and may be configured to receive information provided from the shadow area information DB 200 based on the request of the apparatus 100 for guiding the shadow area. In addition, the communicator 150 may further include a GPS module for a GPS communication. In particular, the GPS module may be configured to receive GPS coordinate information for a point at which the vehicle may be positioned while being driven. The GPS coordinate information may be provided from the navigation system, and the communicator 150 may not include the GPS module.

The position identifier 160 may be configured to identify the position of the vehicle on the driving path based on the map information and the GPS information from the navigation system. In other words, the position identifier 160 may be configured to compare coordinate information of a road and coordinate information of the vehicle on the driving path to detect the position of the corresponding vehicle. In particular, the position coordinate of the vehicle identified by the GPS information and a position of a road coordinate on the map may not be matched. Accordingly, the position identifier 160 may be configured to correct the position coordinate of the vehicle with the position coordinate on the driving path. As an example, the position identifier 160 may be configured to identify the position of the vehicle on the driving path after moving the position coordinate of the vehicle to a coordinate on the nearest road.

The shadow area information analyzer 170 may be configured to receive the position information for the shadow area on the driving path from the shadow area information DB 200 in which the shadow area information may be stored, and analyze road information in the corresponding shadow area. Specifically, the shadow area information analyzer 170 may be configured to identify a position included in the driving path of the corresponding vehicle among the latitude and latitude information for the boundary points of the shadow area provided from the shadow area information DB 200 to detect a start position and a termination position of the shadow area on the driving path of the corresponding vehicle based on the identified position. Meanwhile, the shadow area information analyzer 170 may be configured to linearize a corresponding road for each road section on the driving path in the map and extract interpolation points in each linear section unit. In particular, the shadow area information analyzer 170 may be configured to identify a position of each of the extracted interpolation points. Particularly, the shadow area information analyzer 170 may be configured to identify the positions of the extracted interpolation points for each road section in the shadow area on the driving path.

The distance calculator 180 may be configured to calculate the remaining distance of a corresponding shadow area based on the position of the vehicle in the corresponding shadow area when the vehicle enters the shadow area on the driving path. Accordingly, the distance calculator 180 may be configured to calculate a distance to the termination point of the corresponding shadow area based on the positions of the extracted interpolation points in the shadow area by the shadow area information analyzer 170.

Specifically, the distance calculator 180 may be configured to compare the positions of the interpolation points extracted from the road section on which the corresponding vehicle is driving in the shadow area on the driving path and the position of the vehicle being driven to identify the position of the interpolation point to which the vehicle approaches and to calculate the distance to the termination point of the shadow area based on the position of the corresponding interpolation point. In particular, the distance calculator 180 may be configured to calculate the distance to the termination point of the shadow area by calculating a linear distance between the interpolation points present from the interpolation point to which the vehicle approaches to the termination point of the shadow area. The distance calculator 180 may be configured to re-calculate a distance from the corresponding interpolation point to the termination point of the shadow area when the vehicle reaches each interpolation point on the driving path along the movement of the vehicle in the shadow area on the driving path.

The display controller 190 may be configured to display the remaining distance information of the shadow area calculated by the distance calculator 180 via the output unit 130. In particular, the display controller 190 may be configured to display the distance to the termination point of the shadow area calculated by the distance calculator 180 via the output unit 130 based on the position of the corresponding interpolation point when the corresponding vehicle reaches each interpolation point in the shadow area on the driving path.

Further, the display controller 190 may be configured to display the distance information to the termination point of the shadow area on the screen in a form of an indicator. In particular, the display controller 190 may be configured to update the indicator displayed on the screen based on the distance to the termination point of the shadow area calculated by the distance calculator 180 when the vehicle reaches each interpolation point in the shadow area on the driving path. Moreover, the display controller 190 may be configured to display the distance information to the termination position of the shadow area in a form of a notification message when the vehicle reaches each interpolation point in the shadow area when the vehicle enters the corresponding shadow area.

Figure 2:
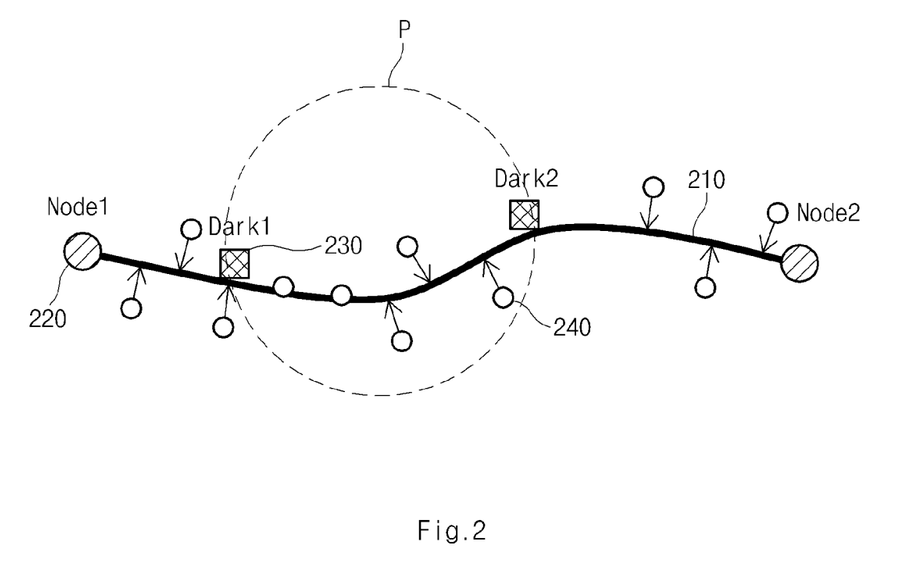
FIGS. 2 to 6 are exemplary illustrative diagrams for describing an operation of the apparatus for guiding the shadow area according to an exemplary embodiment of the present invention.

FIGS. 2 to 6 are exemplary illustrative diagrams describing an operation of the apparatus for guiding the shadow area. In particular, FIG. 2 shows a road section on the driving path, a position of the shadow area and a position along the vehicle movement in the corresponding road section. Referring to FIG. 2, the road section on the map may be classified by nodes. As an example, the road section shown in FIG. 2 shows one road section classified by Node 1 and Node2. A reference numeral '210' represents a road on the map, and a reference numeral '220' represents the node as a unit that classifies each road section. In addition, a reference numeral '230' represents a point matching a boundary point of a shadow area P as a point classifying the shadow area P on the road. A reference numeral '240' represents the position of the vehicle detected on the map.

The apparatus for guiding the shadow area may be executed by the signal processor 110 to identify a position included in the road section of Node 1 to Node 2 among the latitude and longitude information for the boundary points of the shadow area based on the information of the shadow area provided from the shadow area information DB, and may detect a start position Dark 1 and a termination position Dark 2 of the shadow area in the road section of Node 1 to Node 2 based on the identified position. Although the exemplary embodiment of FIG. 2 shows the shadow area included in the road section of one road section, that is, the road section of Node 1 Node 2, the shadow area may be included across a plurality of road sections. In particular, the start position and the termination position of the corresponding shadow area may be identified by identifying the position included in the altitude and longitude information for the boundary points of the corresponding shadow area for each road section.

Moreover, the apparatus for guiding the shadow area may be configured to detect the position of the vehicle based on position coordinate information provided from the navigation system or the GPS module of the corresponding apparatus. In particular, to detect an accurate position of the vehicle, the apparatus for guiding the shadow area may be configured to compare the road coordinate on the map and the position coordinate detected for the corresponding vehicle, and when the coordinates do not match, may be configured to change the position coordinate of the corresponding vehicle to a position coordinate on the nearest road, thereby making it possible to detect the position of the vehicle based on the changed position coordinate.

Figure 3:
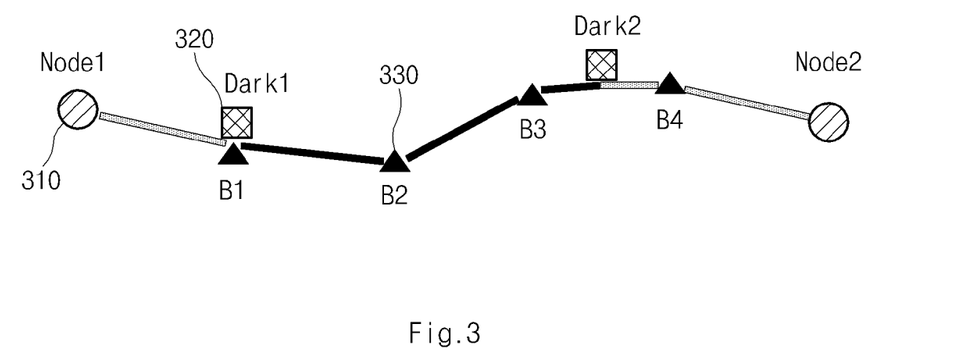

FIG. 3 shows an exemplary operation of extracting an interpolation point from the road section of FIG. 2. The road on the map may have a linear or curve form. According to the exemplary embodiment of the present invention, as shown in FIG. 3, a curve road of each road section may be linearized in a minimum unit and the interpolation points may be extracted in each linear section unit, to calculate the distance based on each interpolation point. In other words, the apparatus for guiding the shadow area may be configured to linearize the road section of Node 1 to Node 2 in the minimum unit and extract the interpolation points of B1 to B4 in each linear section unit. Particularly, a start position Dark 1 of the shadow area in the road section of Node 1 to Node 2 may correspond to a position of an interpolation point B 1, and a termination position Dark 2 of the shadow area may be positioned between interpolation points B and B 4.

Further, when the vehicle arrives at the interpolations B 1 to B 3 in the shadow area in the road section of Node 1 to Node 2, the apparatus may allow the user to easily identify the position and a range of the shadow area by outputting the remaining distance information for the corresponding shadow area. The apparatus may be configured to calculate the distance information to the termination point of the shadow area based on the position of each interpolation point. In particular, as shown in FIGS. 4A and 4B, the remaining distance may be calculated by comparing the position of the interpolation point and the position of the vehicle.

Figure 4A:
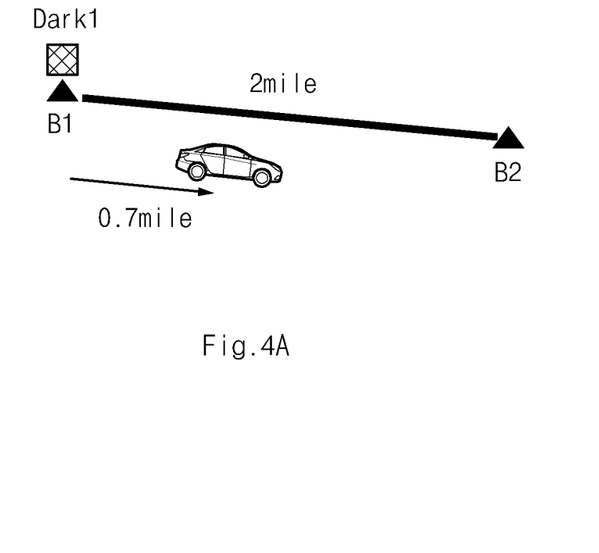
Figure 4B:
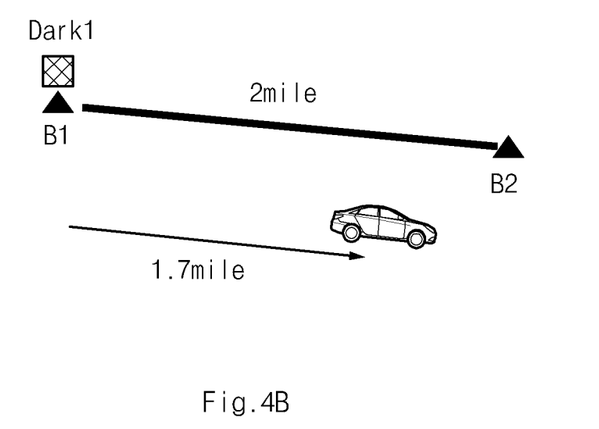

In other words, as shown in FIG. 4A, when the vehicle passes through the interpolation point B1 which may be the start point of the shadow area and drives about 0.7 miles, the apparatus may be configured to calculate the remaining distance by subtracting the position of the corresponding vehicle from a linear distance (e.g., about 2 miles) between the interpolation points B1 and B 2. In addition, as shown in FIG. 4B, when the vehicle passes through the interpolation point Bl which may be the start point of the shadow area and drives about 1.7 miles, the apparatus may be configured to calculate the remaining distance by subtracting the position of the corresponding vehicle from a linear distance (e.g., about 2 miles) between the interpolation points B1 and B2. In particular, the apparatus may be configured to calculate the remaining distance using linear distances between the interpolation points B1,B2, and B3 to the termination point of the shadow area.

Figure 5:
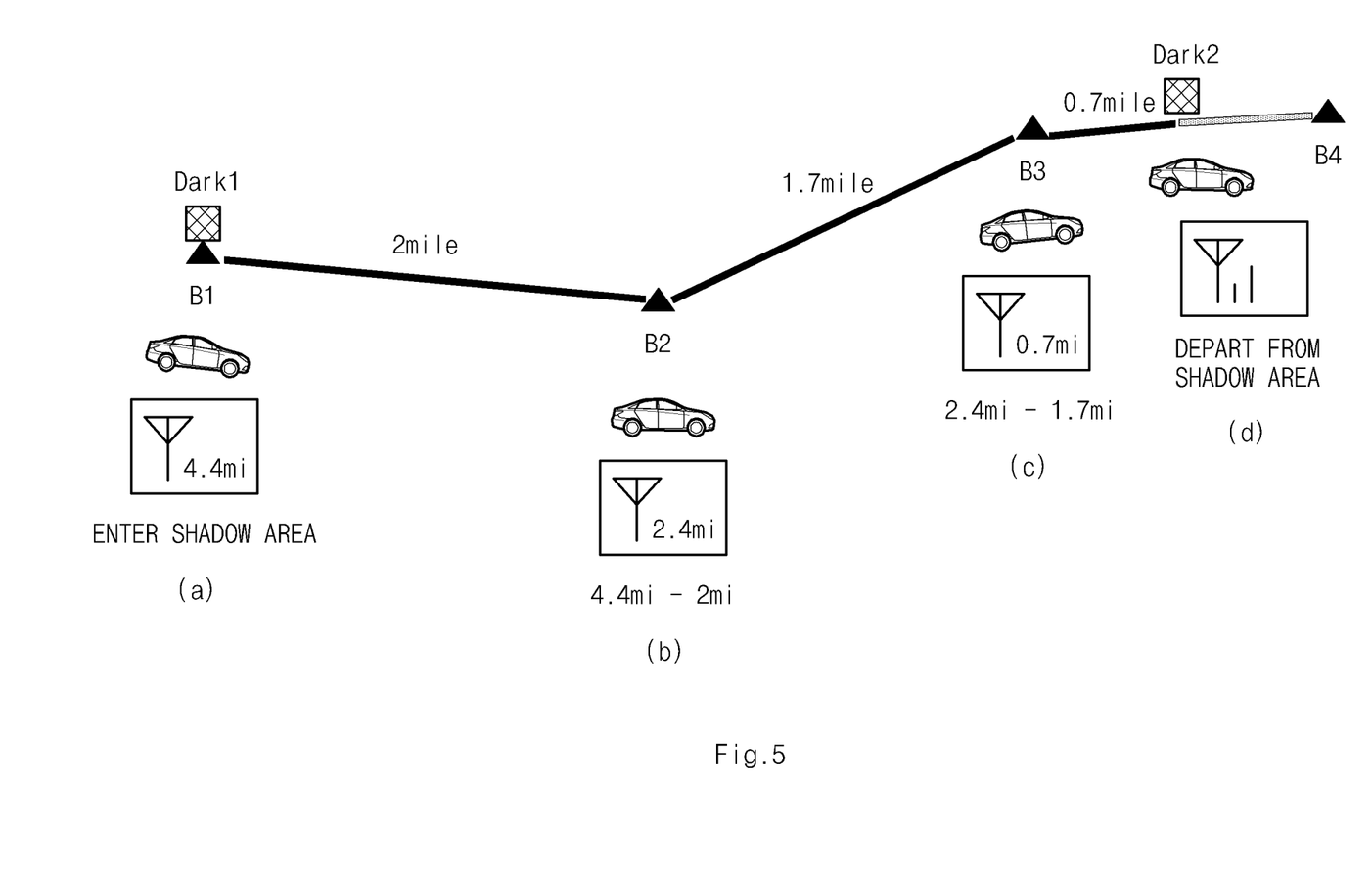
Figure 6:
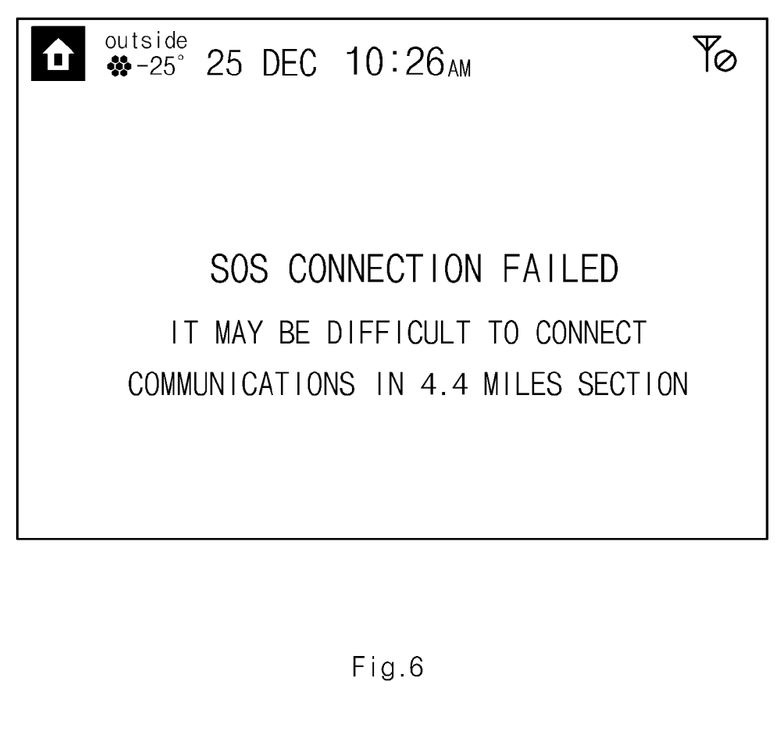

FIGS. 5 and 6 show exemplary embodiments in which the distance information to the termination point of the shadow area may be output based on the position of the vehicle. In particular, as shown in FIG. 5, the apparatus, executed by the signal processor 110, may be configured to output the distance information to the termination point of the shadow area in the form of the indicator.

In other words, as shown in (a) of FIG. 5, when the vehicle reaches the interpolation point B1, the apparatus may be configured to output the indicator that shows that the vehicle has entered into the shadow area and that the distance to the termination point of the shadow area that remains is about 4.4 miles. In addition, as shown in (b) of FIG. 5, when the vehicle reaches the interpolation point B2, since the distance to the termination point of the shadow area remains may be about 2.4 miles, the apparatus may be configured to update and output the indicator provided from (a). Similarly, as shown in (c) of FIG. 5, when the vehicle reaches the interpolation point B3, since the distance to the termination point of the shadow area that remains may be about 0.7 miles, the apparatus may be configured to update and output the indicator provided from (b), and when the corresponding vehicle passes through Dark 2 which may be the termination point of the shadow area, the apparatus may be configured to output the indicator showing a departure from the shadow area and a signal receiving state as shown in (d).

Moreover, as shown in FIG. 6, the apparatus, executed by the signal processor 110, may be configured to output a guidance message such as "SOS connection failed. It may be difficult to connect communications in an about 4.4 miles section." via the screen when entering the arrival at the shadow area. In particular, the apparatus may be configured to output the guidance message for the remaining distance information via the screen when the vehicle reaches each of the interpolation points B1 to B3 in the shadow area.

An exemplary operation flow of the apparatus for guiding the shadow area according to the exemplary embodiment of the present invention configured as described above will be described below in detail.

Figure 7:
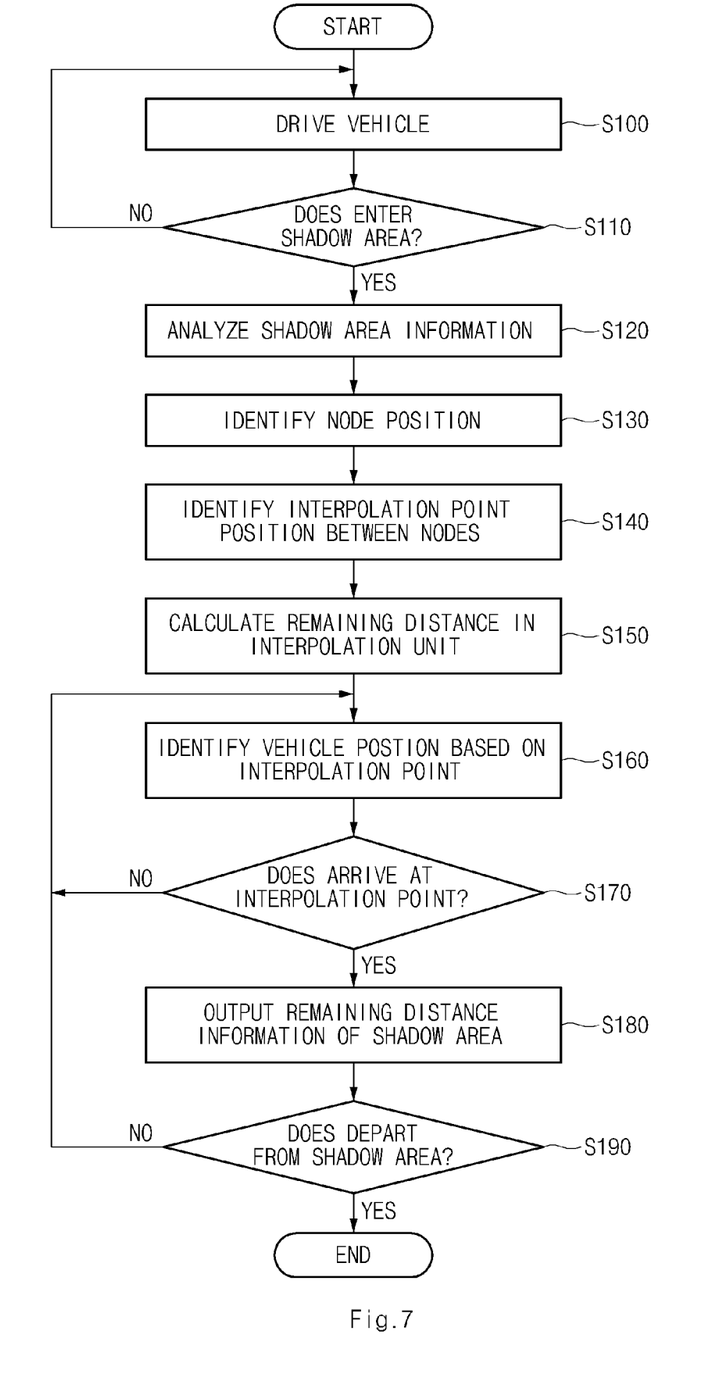
FIG. 7 is an exemplary flow chart showing an operation flow of a method for guiding a shadow area according to an exemplary embodiment of the present invention.

FIG. 7 is an exemplary flow chart showing an operation flow of a method for guiding a shadow area according to an exemplary embodiment of the present invention. Referring to FIG. 7, the apparatus, executed by a processor on a controller, may be configured to analyze information regarding the shadow area (S120) when the vehicle enters the shadow area while being driven (S100 and S110), identify node positions of the road section including the corresponding shadow area on the driving path (S130), and identify the positions of the interpolation points extracted by linearizing the road in the corresponding node section (S140).

Further, the apparatus may be configured to calculate the remaining distance to the termination point of the corresponding shadow area in each interpolation point unit in the corresponding shadow area (S150) and identify the position of the vehicle based on the position of each interpolation point (S160). When the vehicle reaches any one interpolation point in the shadow area (S170), the apparatus may be configured to output the information for the remaining distance to the termination point of the shadow area based on the interpolation point at which the vehicle arrives (S180). In the process of 'S180', the information for the remaining distance to the termination point of the shadow area may be output on a screen in the form of an indicator or a notification message, and may be additionally output in the form of a voice message. The processes of 'S160' to 'S180' may be repeatedly performed until the corresponding vehicle passes through the termination point of the shadow area, and when the vehicle departs from the shadow area, the operation may be terminated (S190).

According to the exemplary embodiment of the present invention, the remaining distance information of the shadow area may be output in a predetermined section when the vehicle enters the shadow area, allowing a user to easily recognize the range of the shadow area, thereby making it possible to allow the user to respond to the emergency situation, the specific event situation, or the like.

The spirit of the present invention has been just exemplified. It will be appreciated by those skilled in the art that various modifications and alterations may be made without departing from the essential characteristics of the present invention. Accordingly, the exemplary embodiments disclosed in the present invention and the accompanying drawings are used not to limit but to describe the spirit of the present invention. The scope of the present invention is not limited only to the exemplary embodiments and the accompanying drawings. The protection scope of the present invention must be analyzed by the accompanying claims and it should be analyzed that all spirit within a scope equivalent thereto are included in the accompanying claims of the present invention.

What is claimed is:

1. An apparatus for guiding a shadow area, the apparatus comprising:
    a memory configured to store program instructions; and
    a processor configured to execute the program instructions, the program instructions when executed configured to:
        identify a vehicle position on a driving path based on map information and global positioning system (GPS) information from a navigation system;
        analyze road information in the shadow area by receiving position information for the shadow area on the driving path from a database in which information regarding the shadow area is stored;
linearize a road for each road section in the shadow area on the driving path;
extract an interpolation point in each linearized section;
compare positions of the interpolation points and the vehicle position in the shadow area on the driving path;
calculate a distance to a termination point of the shadow area based on a position of an interpolation point to which the vehicle approaches; and
output the distance to the termination point of the shadow area.

2. The apparatus according to claim 1, wherein the program instructions when executed are further configured to:
detect a start position and a termination position of the shadow area on the driving path by receiving the map information for the driving path from the navigation system.

3. The apparatus according to claim 1, wherein the program instructions when executed are further configured to:
identify position information of the interpolation points extracted for each road section in the shadow area on the driving path.

4. The apparatus according to claim 3, wherein the program instructions when executed are further configured to:
calculate the distance to the termination point of the shadow area based on linear distances between the interpolation point to which the vehicle approaches and the respective interpolation points.

5. The apparatus according to claim 3, wherein the program instructions when executed are further configured to:
recalculate the distance to the termination point of the shadow area based on the position of the interpolation point when the vehicle reaches the corresponding interpolation point in the shadow area on the driving path.

6. The apparatus according to claim 3, wherein the program instructions when executed are further configured to:
output distance information to the termination point of the shadow area calculated based on the position of the interpolation point when the vehicle reaches the corresponding interpolation point in the shadow area on the driving path.

7. The apparatus according to claim 6, wherein the program instructions when executed are further configured to:
output the distance information to the termination point of the shadow area in a form of an indicator when the vehicle enters the shadow area.

8. The apparatus according to claim 7, wherein the program instructions when executed are further configured to:
update the indicator when the vehicle reaches each interpolation point in the shadow area.

9. The apparatus according to claim 6, wherein the program instructions when executed are further configured to:
output the distance information to termination point of shadow area in a form of a notification message when the vehicle reaches each interpolation area in the shadow area when the vehicle enters the corresponding shadow area.

10. The apparatus according to 1, wherein the program instructions when executed are further configured to:
compare the driving path on the road provided from the navigation system and the vehicle position to correct a position coordinate of the vehicle with a position coordinate on the driving path.

11. A method for guiding a shadow area, the method comprising:

analyzing, by a processor, road information in the shadow area by receiving position information for a corresponding shadow area on a driving path from a database in which information regarding the shadow area is stored;
identifying, by the processor, a vehicle position on the driving path based on global positioning system (GPS) information to identify whether a vehicle enters the shadow area;
when the vehicle enters the shadow area on the driving path, linearizing, by the processor, a corresponding road for each road section in the corresponding shadow area to identify positions of interpolation points extracted in each linear section unit;
comparing, by the processor, positions of the interpolation points and the vehicle position to calculate a distance to a termination point of the shadow area based on a position of an interpolation point to which the vehicle approaches in the corresponding shadow area; and
outputting, by the processor, distance information to the termination point of the shadow area calculated based on the position of the interpolation point to which the vehicle approaches.

12. The method according to claim 11, further comprising:
after outputting the distance information, updating, by the processor, the distance information to the termination point of the shadow area based on a position of a next interpolation point when the vehicle reaches the next interpolation point in the shadow area on the driving path.

13. The method according to claim 11, wherein the distance information to the termination point of the shadow area is output in a form of an indicator when the vehicle enters the shadow area.

14. The method according to claim 11, wherein the distance information to termination point of shadow area is output in a form of a notification message when the vehicle reaches each interpolation area in the shadow area when the vehicle enters the corresponding shadow area.

15. A non-transitory computer readable medium containing program instructions executed by a processor, the computer readable medium comprising:
program instructions that analyze road information in the shadow area by receiving position information for a corresponding shadow area on a driving path from a database in which information regarding the shadow area is stored;
program instructions that identify a vehicle position on the driving path based on global positioning system (GPS) information to identify whether a vehicle enters the shadow area;
program instructions that linearize a corresponding road for each road section in the corresponding shadow area to identify positions of interpolation points extracted in each linear section unit when the vehicle enters the shadow area on the driving path;
program instructions that compare positions of the interpolation points and the vehicle position to calculate a distance to a termination point of the shadow area based on a position of an interpolation point to which the vehicle approaches in the corresponding shadow area; and
program instructions that output distance information to the termination point of the shadow area calculated based on the position of the interpolation point to which the vehicle approaches.

16. The non-transitory computer readable medium of claim 15, further comprising:

program instructions that update the distance information to the termination point of the shadow area based on a position of a next interpolation point when the vehicle reaches the next interpolation point in the shadow area on the driving path after outputting the distance information.

17. The non-transitory computer readable medium of claim 15, wherein the distance information to the termination point of the shadow area is output in a form of an indicator when the vehicle enters the shadow area.

18. The non-transitory computer readable medium of claim 15, wherein the distance information to termination point of shadow area is output in a form of a notification message when the vehicle reaches each interpolation area in the shadow area when the vehicle enters the corresponding shadow area.

* * * * *